(12) United States Patent
Bodendorf et al.

(10) Patent No.: US 12,343,667 B2
(45) Date of Patent: Jul. 1, 2025

(54) DEAERATING DEVICE

(71) Applicant: Bayerische Motoren Werke Aktiengesellschaft, Munich (DE)

(72) Inventors: Frank Bodendorf, Kaufering (DE); Moritz Hoescheler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 383 days.

(21) Appl. No.: 17/801,308

(22) PCT Filed: Mar. 26, 2021

(86) PCT No.: PCT/EP2021/057893
§ 371 (c)(1),
(2) Date: Aug. 22, 2022

(87) PCT Pub. No.: WO2021/213778
PCT Pub. Date: Dec. 8, 2021

(65) Prior Publication Data
US 2023/0096702 A1    Mar. 30, 2023

(30) Foreign Application Priority Data
Apr. 21, 2020  (DE) .................... 10 2020 110 775.7

(51) Int. Cl.
*B01D 19/00*  (2006.01)
*B01D 45/06*  (2006.01)
*B01D 45/08*  (2006.01)

(52) U.S. Cl.
CPC ......... *B01D 45/08* (2013.01); *B01D 19/0031* (2013.01); *B01D 45/06* (2013.01)

(58) Field of Classification Search
CPC .... B01D 45/08; B01D 19/0031; B01D 45/06; F16H 57/027

(Continued)

(56) References Cited

U.S. PATENT DOCUMENTS

2004/0025483 A1* 2/2004 Norman ................ B01D 45/06
                                                          55/444
2007/0295158 A1* 12/2007 Adleman .............. F16H 57/027
                                                          74/606 R (Continued)

FOREIGN PATENT DOCUMENTS

CN    102135171 A     7/2011
CN    202251861 U  *  5/2012

(Continued)

OTHER PUBLICATIONS

International Search Report (PCT/ISA/210) issued in PCT Application No. PCT/EP2021/057893 dated Jun. 17, 2021 with English translation (four (4) pages).

(Continued)

*Primary Examiner* — T. Bennett McKenzie
(74) *Attorney, Agent, or Firm* — Crowell & Moring LLP

(57) ABSTRACT

A deaerating device is provided for a drive component in a motor vehicle. The deaerating device has an access line, a membrane deaerator, which includes a deaerating membrane, and an discharge air side. The deaerating device is designed to fluidically connect the interior of a drive component to the area surrounding the drive component. The deaerating membrane is arranged downstream of the access line and upstream of the discharge air side in a planned flow direction from the drive component into the area surrounding the drive component. The access line has an aerosol trap which has a labyrinth element for accumulating liquid on at least one wall of the labyrinth element, and the aerosol trap is designed as a separate component with respect to the access line and the membrane deaerator.

7 Claims, 3 Drawing Sheets

(58) Field of Classification Search
USPC .................................................. 96/190–192
See application file for complete search history.

(56) References Cited

U.S. PATENT DOCUMENTS

2014/0096683 A1* 4/2014 Azwell ................. B01D 46/30
55/327
2019/0271384 A1 9/2019 Tesner et al.

FOREIGN PATENT DOCUMENTS

| CN | 103122987 A | 5/2013 |
| CN | 203847676 U | 9/2014 |
| CN | 104633065 A | 5/2015 |
| CN | 205315669 U | 6/2016 |
| CN | 106286786 A | 1/2017 |
| CN | 108119637 A | 6/2018 |
| CN | 108644361 A | 10/2018 |
| CN | 208503427 U | 2/2019 |
| DE | 10 2008 003 970 A1 | 7/2009 |
| DE | 10 2015 002 320 A1 | 9/2016 |
| EP | 1 329 598 A1 | 7/2003 |
| EP | 1 329 598 B1 | 12/2006 |

OTHER PUBLICATIONS

German-language Written Opinion (PCT/ISA/237) issued in PCT Application No. PCT/EP2021/057893 dated Jun. 17, 2021 (six (6) pages).

German-language Search Report issued in German Application No. 10 2020 110 775.7 dated Mar. 16, 2021 with partial English translation (16 pages).

Chinese-language Office Action issued in Chinese Application No. 202180015577.8 dated Feb. 14, 2025 with English translation (18 pages).

Chinese-language Office Action issued in Chinese Application No. 202180015577.8 dated Apr. 24, 2025 with English translation (12 pages).

* cited by examiner

DEAERATING DEVICE

BACKGROUND AND SUMMARY

The invention relates to a deaerating device which connects an internal space of an apparatus to the environment which surrounds this apparatus, wherein an aerosol can be produced in this internal space during planned operation of the apparatus.

In this case, the invention is based on EP 1 329 598 B1, wherein in particular the structural space requirement of the present deaerating device is reduced with respect to the deaerating device known from the prior art. There are generally known membrane deaerating elements in which a membrane is arranged in the deaerating device and a gas exchange and therefore the deaerating functionality are thereby carried out between the apparatus to be deaerated and the environment which surrounds this apparatus. DE 10 2015 002 320 A1 relates to a deaerating apparatus for a transmission housing and has a membrane element. The access from the internal space of the transmission housing to this membrane can be interpreted to be an internal chimney-like labyrinth in portions.

The invention is explained below in connection with a motor vehicle gear mechanism, this is not intended to be understood to be a limitation of the invention to such an application. In motor vehicles, a general objective is to achieve a high power density, in particular in the drive system. As a result of this general requirement, the structural space available for components is "small". Furthermore, a motor vehicle is subjected to diverse requirements and environmental conditions, for which reason the requirements placed on the functionality or the functional reliability of components in the motor vehicle construction is "high". In a motor vehicle gear mechanism in which the components which are arranged in the internal space of the gear mechanism are lubricated with oil, heat is generated during operation, as a result of inevitable losses, and as a result of the oil lubrication, a so-called aerosol is produced, that is to say, an admixture of air with finely atomized oil droplets. In particular, the heating makes a gas exchange from the gear mechanism internal space with the environment surrounding the gear mechanism necessary and, in order to deaerate, the oil has to be separated from the aerosol and retained in the gear mechanism internal space.

Deaerating apparatuses known from the prior art have either a structural space requirement which is too high or an oil separation capacity which is too low, that is to say, the ability to separate liquid drops from the aerosol.

An object of the proposed invention is to provide a deaerating apparatus with a compact structure and high level of functionality which is suitable for use in a motor vehicle. This object is achieved by a deaerating apparatus according to the independent claim. Developments of the invention which may be preferred are set out in the dependent patent claims.

In the context of the invention, the term "deaerating apparatus" is intended to be understood to be an apparatus which is configured in particular to allow a pressure compensation between an internal space of a drive component, preferably a motor vehicle gear mechanism, and an environment which surrounds the drive component. From the prior art, different deaerating devices are known and the invention relates to a deaerator having a deaerating membrane. Furthermore, such a deaerating apparatus has an access line, wherein the access line is in the form of a line or preferably a portion of a line for connecting in a fluid-conveying manner the internal space of the drive component to the deaerating device. Preferably, the access line is in the form of a housing channel and preferably a pipeline or hose line or the like, or at least partially has such a line.

The deaerating device is preferably in the form of a so-called membrane deaerator having a deaerating membrane. In particular, such a deaerating membrane is sensitive to liquid wetting with specific liquids, in particular with respect to wetting with lubricants. Preferably, the membrane deaerator has a deaerating labyrinth in a housing portion upstream of the deaerating membrane with respect to a planned flow direction in the deaerating apparatus from the internal space of the drive component into the environment surrounding it. Preferably, the deaerating labyrinth is configured to separate liquid from a gas in which liquid in the form of drops is received, so-called aerosol. The prior art discloses different construction types for such a deaerating labyrinth, in particular a so-called chimney-like labyrinth is known. Downstream of the deaerating membrane, the membrane deaerator and therefore the deaerating apparatus has a discharge air side. Preferably, the discharge air side has a covering cap, in particular for the deaerating membrane, and is configured particularly to discharge the gas which has been introduced through the deaerating membrane in a targeted manner. In other words, the deaerating apparatus is configured to connect an internal space of the drive component, in particular the internal space thereof, to an environment which surrounds the drive component in a fluid-conveying manner, wherein the membrane deaerator particularly ensures that both an introduction of impurities, in particular water, into the internal space of the drive component and a discharge of liquid, in particular lubricant, from the internal space into the environment, are prevented or reduced.

It is proposed that, in particular in order to improve the separation of liquid from an aerosol which flows through the access line to the deaerating membrane, a/an, particularly additional, aerosol trap be provided, wherein this aerosol trap has a labyrinth region for depositing liquid at least at one wall of the labyrinth region. Furthermore, this aerosol trap is in the form of a separate component with respect to the access line and with respect to the membrane deaerator. In particular, such a structure allows, on the one hand, a retrofitting of the aerosol trap in existing deaerating apparatuses which currently do not have any such additional aerosol trap. Preferably, an external diameter of the aerosol trap is smaller than an external diameter of the deaerating membrane or smaller than a maximum dimension of the deaerating membrane. Particularly with such a compact structure, a smaller structural space requirement and a high level of functionality for the aerosol trap and therefore for the deaerating apparatus can be achieved.

In a preferred embodiment, the aerosol trap has an access region, through which aerosol during planned operation of the aerosol trap flows out of the access line into the trap. Preferably, therefore, the access region is configured to introduce aerosol into the aerosol trap in the planned flow direction from the access line. In a more preferable manner, the aerosol trap has a labyrinth region, wherein this labyrinth region is arranged in the planned flow direction downstream of the access region. More preferably, the aerosol trap has an external wall, preferably this external wall surrounds at least the throughflow region and more preferably the throughflow region is configured to guide the aerosol from the access region to the labyrinth region. Preferably, at least one or more recesses in the external wall are provided in the access region. More preferably, the aerosol trap is constructed integrally as a plastics component and has a plastics material at least as a component or comprises this plastics material. Preferably, therefore, the aerosol trap is configured in such a manner that aerosol is introduced from the access line into the trap, in the planned flow direction after the access region flows through the throughflow region and is directed from the throughflow region into the labyrinth region, in which liquid and in particular lubricant, preferably oil, is separated from the aerosol, preferably is deposited at least at one wall of the labyrinth region. After leaving, that is to say, after flowing onward in the planned flow direction to the membrane deaerator, the liquid portion in the aerosol is reduced or the liquid taken up in the aerosol originally is completely separated in the aerosol trap so that less liquid reaches the membrane deaerator and thus the functionality thereof is increased.

In a preferred embodiment, the labyrinth region has at least two impact walls. In the context of the invention, the term "impact wall" is intended to be understood to be a wall portion or a wall in the aerosol trap which impedes a linear flow through the aerosol trap. More preferably, such an impact wall is intended to be understood to be a wall for depositing liquid from an aerosol which flows through the aerosol trap. Preferably, the aerosol trap is in the form of an at least substantially cylindrical component which extends along a cylinder axis. Preferably, the aerosol flows substantially along this cylinder axis during planned operation through the aerosol trap and more preferably an impact wall is intended to be understood to be a wall portion which diverts or redirects the aerosol flow.

The prior art discloses different configurations for such a labyrinth region. Preferably, at least one impact wall is in the form of a helical or screw-like wall and preferably in the form of a planar wall which completely or partially projects into the throughflow region and therefore forms the labyrinth region. In the labyrinth region, liquid is separated during planned operation of the aerosol trap, in particular in that the aerosol is deposited on one or more impact walls if the aerosol is redirected by the impact wall from a linear flow along the cylinder axis. More preferably, in the planned throughflow direction downstream of at least one of the impact walls and preferably a plurality of impact walls and preferably all the impact walls, a labyrinth recess is arranged directly in the external wall. Tests have shown that with such a configuration a particularly high degree of separation of liquid from the aerosol can be achieved.

In a preferred embodiment, the labyrinth region has linear or planar impact walls. Preferably, such a labyrinth region has two or more impact walls and more preferably at least two of these impact walls are spaced apart from each other by the aerosol trap in the planned flow direction and arranged parallel with each other. In particular, such an embodiment of the aerosol trap allows simple configuration thereof.

In a preferred embodiment, the labyrinth region has linear or planar impact walls. Preferably, such a labyrinth region has two or more impact walls and more preferably two of these impact walls are spaced part in the planned throughflow direction and arranged obliquely relative to each other. In particular, such an embodiment of the impact walls leads to a powerful redirection of the aerosol flow in the aerosol trap and therefore a high degree of separation of liquid from the aerosol, in other words "much" liquid is deposited on the walls of the aerosol trap at a high degree of separation.

In a preferred embodiment, at least one of the impact walls and more preferably at least one of the planar impact walls has at least one through-opening. Preferably, such a through-opening is intended to be understood to be a recess in the impact wall so that a fluid-conveying connection in the planned flow direction from one side of the impact wall to the other side of this impact wall is produced. Preferably, in particular through such a through-opening, a flow of aerosol through the impact wall is enabled so that in particular the flow resistance in the aerosol trap is thereby reduced and, on the other hand, in particular as a result of this at least one through-opening a backflow of liquid collected in the aerosol trap into the internal space of the drive apparatus is enabled.

In a preferred embodiment, the aerosol trap is in the form of a substantially elongate component. Preferably, the aerosol trap has in the throughflow region at least partially a cross sectional surface-area which can be flowed through and which has a maximum extent L. Figuratively speaking, the aerosol trap may be in the form of a circular-cylindrical pipe, preferably at least in the throughflow region. In such an embodiment, (circular-cylindrical pipe in the throughflow region), there would be produced the cross sectional surface-area which can be flowed through in the throughflow region as a circular area and the maximum extent L would then correspond to the diameter of this circular area.

More preferably, the labyrinth region in the planned flow direction is spaced apart from the access region in the aerosol trap by 1.5 times L or more. In particular, such a configuration allows a "slim" and "elongate" configuration of the aerosol trap and leads in particular to calming the aerosol flow in the throughflow region and therefore a good degree of separation in the labyrinth region.

Individual features and embodiments of the invention are explained in greater detail below with reference to the Figures; in this case, different features of the embodiments shown can also be combined to form new embodiments.

DETAILED DESCRIPTION OF THE DRAWINGS

Figure 1:
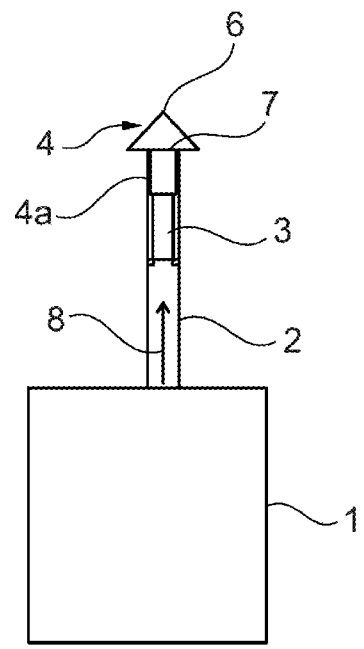
FIG. 1 is a schematic illustration of a drive component with a deaerating apparatus.

FIG. 1 shows a schematic illustration of a drive component 1 which is in the form of a motor vehicle gear mechanism, in a state illustrated with a deaerating apparatus. The deaerating apparatus has the access line 2, in which the aerosol trap 3 is arranged. During planned operation, aerosol flows from the internal space of the drive component 1 in the planned flow direction 8 through the access line 2 into the aerosol trap 3. In this aerosol trap 3, liquid is separated from the aerosol and guided back into the drive component 1 again. After the aerosol trap 3, the aerosol is at least substantially cleaned of the liquid by a so-called chimney-like labyrinth 4a of the membrane deaerator 4 before it flows out into the environment surrounding the drive components through the deaerating membrane 7 and the discharge air region 6. Particularly as a result of the proposed invention, it is possible to use the aerosol trap 3 in an existing access line 2, as a result of its "slim" configuration, in addition to a labyrinth which is configured in any manner on the membrane deaerator 4. By being guided repeatedly through different labyrinths (aerosol trap 3, chimney-like labyrinth 4a), the degree of separation in the aerosol is improved and the deaerating membrane 7 is acted on less with liquid from the drive component 1, whereby in particular the service-life and functionality thereof are improved.

Figure 2:
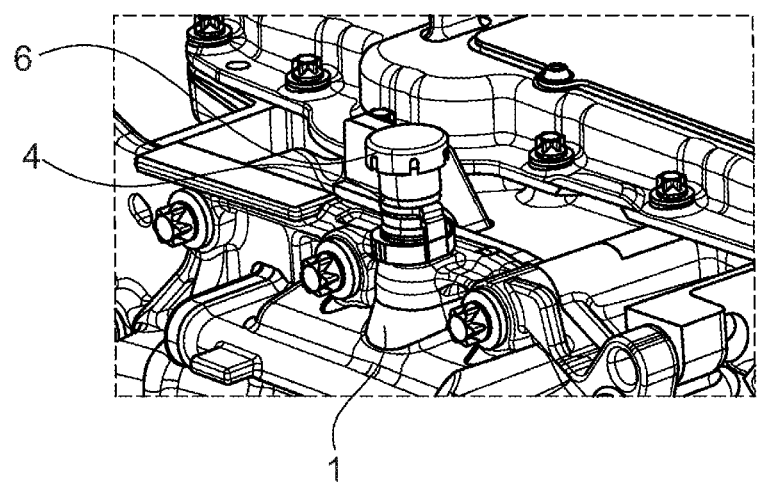
FIG. 2 is a perspective part-view of a drive component which is in the form of a motor vehicle gear mechanism with a membrane deaerator.

FIG. 2 illustrates a perspective illustration of a portion of a drive component 1 with a membrane deaerator 4. The membrane deaerator 4 has a discharge air region 6 for the planned discharge of "cleaned" aerosol, that is to say, substantially of air, into the environment which surrounds the drive component 1. The aerosol trap 3 cannot be seen in this Figure (FIG. 2) because it is completely integrated in the channel which connects the membrane deaerator 4 to the internal space of the drive component 1 in a fluid-conveying manner. This channel, which is not illustrated, is accordingly intended to be understood according to the invention to be an access line from the internal space of the drive component 1 to the membrane deaerator 4.

Figure 3:
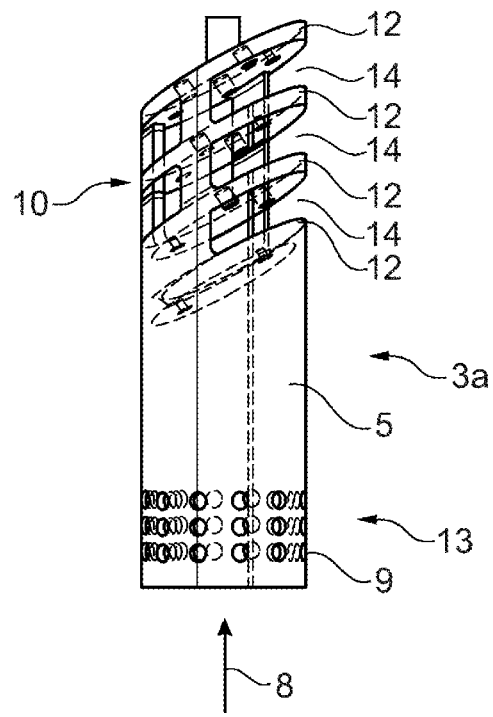
FIG. 3 is a partially transparent perspective view of a first embodiment of an aerosol trap.

FIG. 3 illustrates a partially transparent perspective view of a first aerosol trap 3a, that is to say, an aerosol trap with impact walls 12 orientated in a mutually parallel manner. During planned operation, aerosol from the internal space of the drive component can be introduced via the access region 13 with the recesses 9 in the planned flow direction 8 into the aerosol trap 3a. From the access line 2 (not illustrated), the aerosol flows into this access region 13 and is guided out of this region through the throughflow region 5 which is in the form of a cylindrical pipe to the labyrinth region 10. In this embodiment of the aerosol trap, the labyrinth region 10 has a plurality of mutually parallel impact walls 12. Most of these impact walls 12 are directly adjacent to labyrinth recesses 14.

Figure 4:
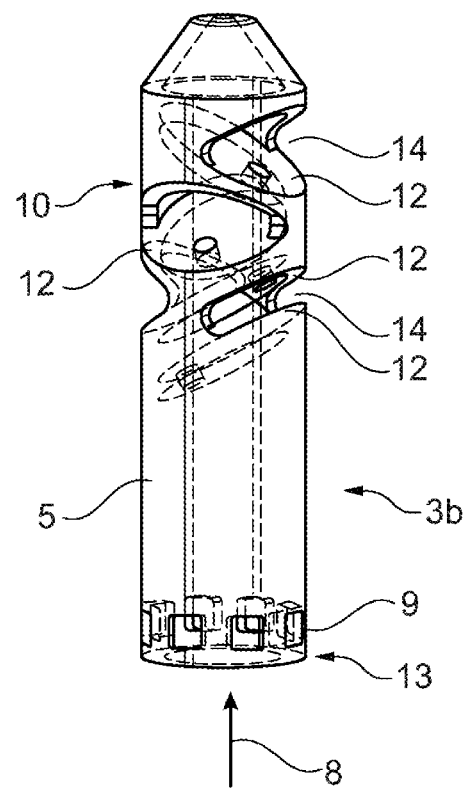
FIG. 4 is a partially transparent perspective view of a second embodiment of an aerosol trap.

FIG. 4 illustrates a partially transparent, perspective view of a second aerosol trap 3b, that is to say, an aerosol trap with impact walls 12 which are orientated obliquely relative to each other. Via the access region 13 with the recesses 9, during planned operation aerosol from the internal space of the drive component can be introduced in the planned flow direction 8 into the aerosol trap 3a. From the access line 2 (not illustrated), the aerosol flows into this access region 13 and is guided out of this region through the throughflow region 5 which is in the form of a cylindrical pipe to the labyrinth region 10. In this embodiment of the aerosol trap 3b, the labyrinth region 10 has a plurality of mutually oblique impact walls 12. Most of these impact walls 12 are directly adjacent to labyrinth recesses 14.

Figure 5:
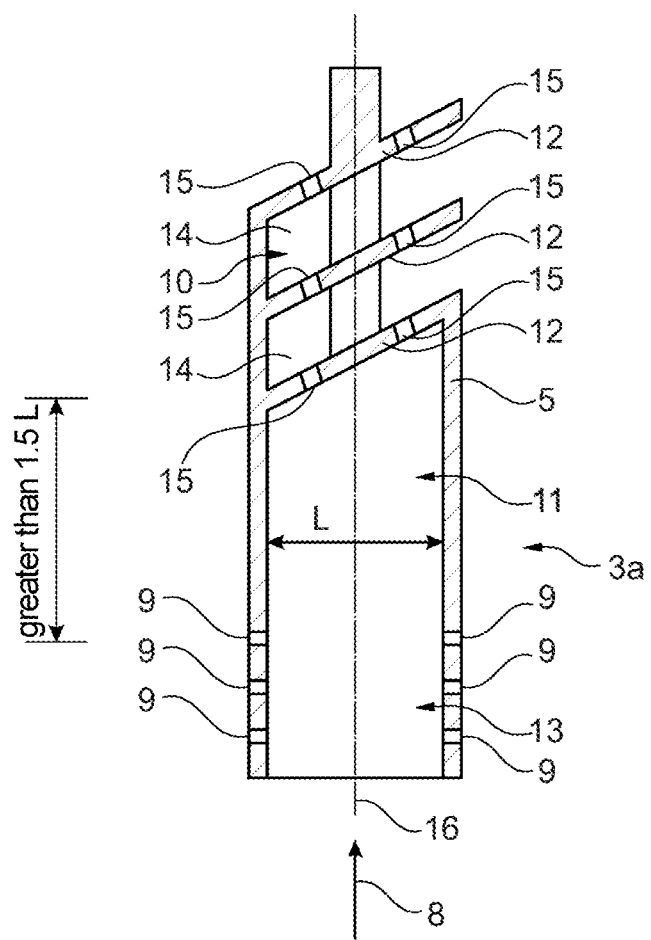
FIG. 5 is a longitudinal section view of a first embodiment of an aerosol trap.

FIG. 5 illustrates a sectional illustration of the first aerosol trap 3a. This first aerosol trap 3a can be flowed through in the planned direction of flow 8 with aerosol. In the access region 13, the first aerosol trap 3a has a series of recesses 9. The throughflow region 11 is in the form of a cylindrical-pipe-like portion with the external wall 5. In the planned flow direction 8, the labyrinth region 10 is adjacent to the throughflow region 11. In the labyrinth region 10, a series of impact walls 12 is arranged. The impact walls 12 have a series of through-openings 15. With such a through-opening, a first side of one of the impact walls is connected in a fluid-conveying manner to a second side of the impact walls 12. Most of the impact walls are each directly adjacent to a labyrinth recess 14.

The aerosol trap 3a extends along the cylinder axis 16 as a substantially cylindrical-pipe-like component. In the throughflow region 11, the cross sectional surface-area which can be flowed through by aerosol (orthogonally to the cylinder axis) has the maximum extent L which corresponds to the internal diameter of the cylindrical pipe. In this case, the spacing of the access region 13 from the labyrinth region 10 is greater by 1.5 times L or more so that the aerosol trap has an elongate "slim" shape.

Particularly in an operating situation in which the atmospheric pressure in the environment surrounding the drive component is greater than in the drive component, as a result of the deaerating apparatus a flow through it is also possible counter to the planned flow direction 8, in particular for pressure compensation.

| List of reference numerals: | |
| --- | --- |
| 1 | Drive component |
| 2 | Access line |
| 3 | Aerosol trap |
| 3a | Aerosol trap with parallel impact walls |
| 3b | Aerosol trap with oblique impact walls |
| 4 | Membrane deaerator |
| 4a | Chimney-like labyrinth |
| 5 | External wall |
| 6 | Discharge air side |
| 7 | Deaerating membrane |
| 8 | Planned flow direction |
| 9 | Recess in 13 |
| 10 | Labyrinth region |
| 11 | Throughflow region |
| 12 | Impact wall |
| 13 | Access region |
| 14 | Labyrinth recess |
| 15 | Through-hole |
| 16 | Cylinder axis |

The invention claimed is:

1. A deaerating device for a drive component in a motor vehicle, comprising:
    an access line;
    a membrane deaerator having a deaerating membrane; and
    a discharge air side, wherein
        the deaerating device is configured to connect in a fluid-conveying manner an internal space of the drive component to an environment which surrounds the drive component,
        the deaerating membrane is arranged downstream of the access line and upstream of the discharge air side in a planned flow direction from the drive component into the environment,
    an aerosol trap in the access line, the aerosol trap having a labyrinth for depositing liquid on at least one wall of the labyrinth, wherein
        the aerosol trap is in the form of a separate component with respect to the access line and with respect to the membrane deaerator,
        the aerosol trap has an access region and a labyrinth region downstream of the access region in the planned flow direction,
        the aerosol trap has an external wall surrounding a throughflow region connecting the access region to the labyrinth region in a fluid-conveying manner,
        at least two impact walls are arranged in the labyrinth region, and
        a labyrinth opening in a lateral side of the external wall is downstream of at least one of the impact walls in the planned flow direction.

2. The deaerating device according to claim 1, wherein at least one or more recesses in the external wall are provided in the access region.

3. The deaerating device according to claim 1, wherein
at least two of the impact walls are spaced apart in the planned throughflow direction and are arranged parallel with each other.

4. The deaerating device according to claim 1, wherein
at least two of the impact walls are spaced apart in the planned throughflow direction and are arranged obliquely to each other.

5. The deaerating device according to claim 1, wherein
at least one of the impact walls has a throughflow opening.

6. The deaerating device according to claim 1, wherein
the throughflow region has at least partially a cross sectional surface-area which is flowable through and which has a maximum extent L, and
in the planned flow direction, the labyrinth region is spaced apart from the access region by at least 1.5 times L.

7. The deaerating device according to claim 1, further comprising at least three of the impact walls and a plurality of the labyrinth openings, each of the labyrinth openings being between situated between adjacent impact walls.

\* \* \* \* \*